US010394028B2

(12) United States Patent
Takagi et al.

(10) Patent No.: US 10,394,028 B2
(45) Date of Patent: Aug. 27, 2019

(54) VIRTUAL IMAGE DISPLAY APPARATUS

(71) Applicant: SEIKO EPSON CORPORATION, Tokyo (JP)

(72) Inventors: Masayuki Takagi, Matsumoto (JP); Takahiro Totani, Suwa (JP); Toshiaki Miyao, Matsumoto (JP); Takashi Takeda, Suwa (JP); Akira Komatsu, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 56 days.

(21) Appl. No.: 15/369,144

(22) Filed: Dec. 5, 2016

(65) Prior Publication Data

US 2017/0184853 A1 Jun. 29, 2017

(30) Foreign Application Priority Data

Dec. 24, 2015 (JP) ................. 2015-251074

(51) Int. Cl.
*G02B 27/01* (2006.01)

(52) U.S. Cl.
CPC .... *G02B 27/0172* (2013.01); *G02B 2027/013* (2013.01); *G02B 2027/0118* (2013.01); *G02B 2027/0178* (2013.01)

(58) Field of Classification Search
CPC ........ G02B 27/0172; G02B 2027/0118; G02B 2027/013; G02B 2027/0178; G02B 27/017; G02B 27/0176; G02B 27/283; G02B 27/0101; G02B 5/003; G02B 6/00

USPC ................. 359/614, 630, 631, 633
See application file for complete search history.

(56) References Cited

U.S. PATENT DOCUMENTS

| | | | | |
|---|---|---|---|---|
| 8,605,008 | B1* | 12/2013 | Prest ................. | G02B 27/0176 345/7 |
| 9,875,406 | B2* | 1/2018 | Haddick ............ | G06K 9/00604 |
| 10,120,191 | B2* | 11/2018 | Rudolph ............ | G02B 27/0172 |
| 2002/0191297 | A1* | 12/2002 | Gleckman ......... | G02B 27/0172 359/629 |
| 2012/0223354 | A1* | 9/2012 | Hayat ................. | B82Y 20/00 257/98 |
| 2012/0251095 | A1* | 10/2012 | Ono .................... | G02B 5/003 396/505 |
| 2013/0242392 | A1* | 9/2013 | Amirparviz ....... | G02B 27/0172 359/485.05 |
| 2013/0278631 | A1* | 10/2013 | Border .............. | G02B 27/017 345/633 |

FOREIGN PATENT DOCUMENTS

JP 2012-163661 A 8/2012

* cited by examiner

*Primary Examiner* — Collin X Beatty
(74) *Attorney, Agent, or Firm* — Oliff PLC (57) ABSTRACT

An apparatus has a see-through configuration that guides picture lights by a light guide device and superimposes lights from the outside world and the picture lights for visual recognition. The light guide device has a light guide prevention structure (light transmission prevention structure) provided in a narrow width shape part having a narrower shape than a surrounding part, and thereby, prevents unintended reflection or the like of lights due to the lights from the outside world and suppresses light guide of the lights toward an observer side.

12 Claims, 10 Drawing Sheets

VIRTUAL IMAGE DISPLAY APPARATUS

BACKGROUND

1. Technical Field

The present invention relates to a virtual image display apparatus such as a head mount display that presents images formed by an image display device or the like to an observer.

2. Related Art

As virtual image display apparatuses including head mount displays (hereinafter, referred to as HMDs) attached to heads of observers, see-through displays that superimpose picture lights and lights from the outside world are known (see Patent Document 1 (JP-A-2012-163661)).

In the see-through virtual image display apparatus, leakage lights (stray lights) are generated due to unintended reflection of lights from the outside world and tend to be ghost lights or the like, and it is very important to suppress the generation of leakage lights. For example, in Patent Document 1, an incidence suppression unit that suppresses incidence of lights from outside is provided on a side surface of a part that guides picture lights.

However, in the case where the shape of the member that guides picture light varies such that the member has a curved shape portion or a narrow portion, the probability of unintended reflection of lights from the outside world becomes higher and, for example, an event that the lights are once reflected toward an image display device side, become leakage lights, and are guided in a light guide direction and visually recognized by an observer may occur.

SUMMARY

An advantage of some aspects of the invention is to provide a virtual image display apparatus that may suppress unintended lights due to lights from the outside world traveling toward an observer and maintain the better guide condition of picture lights.

A virtual image display apparatus according to an aspect of the invention includes a picture device (image display device) that generates picture lights, and a light guide device that guides the picture lights from the picture device by reflection using a plurality of surfaces and superimposes lights from the outside world and the picture lights for visual recognition, wherein the light guide device has a light guide prevention structure that prevents light guide of leakage lights due to reflection of the lights from the outside world by a curved surface of the light guide device in a narrow width shape part having a narrower shape than a surrounding part.

In the virtual image display apparatus, the light guide prevention structure is provided in the narrow width shape part of the light guide device, and thereby, unintended lights due to the lights from the outside world traveling toward an observer may be suppressed and the better light guide condition of the picture lights may be maintained.

In a specific aspect of the invention, the light guide prevention structure is formed on a side of another side surface than a light guide surface that directly contributes to light guide of the picture lights of surfaces of the narrow width shape part. In this case, light guide of leakage light may be prevented on the side surface.

In another aspect of the invention, the light guide device includes non-axisymmetric curved surfaces as the plurality of surfaces that guide the picture lights. In this case, the apparatus may be downsized using the non-axisymmetric curved surfaces.

In yet another aspect of the invention, the narrow width shape part of the light guide device is covered by a light shielding member. In this case, direct incidence of the lights from the outside world may be suppressed in the narrow width shape part. Further, in this case, the narrow width shape part is incorporated in the light shielding member of e.g. a lens tube housing a projection lens or the like, and thereby, assembly of the light guide device and another optical component may be accurately performed.

In yet another aspect of the invention, the narrow width shape part of the light guide device is provided on an incident side of the picture lights of the light guide device and connected to an attachment part of the light shielding member. In this case, generation of unintended lights in the narrow width shape part due to unwanted component lights from the picture device side may be suppressed.

In yet another aspect of the invention, the light guide prevention structure is formed by application of a colored adhesive agent to the narrow width shape part. In this case, unintended lights (leakage lights) due to the lights from the outside world are absorbed by the colored adhesive agent, and thereby, light guide of the lights by reflection and refraction in the narrow width shape part toward the observer may be suppressed.

In yet another aspect of the invention, the adhesive agent forming the light guide prevention structure is a black UV curing adhesive agent. In this case, the light guide prevention structure that can easily perform desired light absorption by UV irradiation may be formed.

In yet another aspect of the invention, the adhesive agent forming the light guide prevention structure is a black thermosetting adhesive agent. In this case, the light guide prevention structure that can easily perform desired light absorption by thermal curing may be formed.

In yet another aspect of the invention, the adhesive agent forming the light guide prevention structure is a black moldable tape adhesive. In this case, the light guide prevention structure that can perform proper light absorption may be formed in a range necessary in the narrow width shape part using the moldable tape adhesive.

In yet another aspect of the invention, the adhesive agent forming the light guide prevention structure is a black hot-melt adhesive agent. In this case, the light guide prevention structure that can easily perform light absorption may be formed in a proper range.

In yet another aspect of the invention, a surface on which the light guide prevention structure is formed of the surfaces of the narrow width shape part of the light guide device is an embossed surface. In this case, the leakage lights entering the surface of the narrow width shape part may be adequately diffused by the embossing.

In yet another aspect of the invention, a surface on which the light guide prevention structure is formed of the surfaces of the light guide surfaces of the light guide device is subjected to hard coating treatment or AR treatment, and a surface of the narrow width shape part is not subjected to hard coating treatment or AR treatment. In this case, the light guide surfaces of the light guide device exposed to the outside are made suitable for the optical system for see-through vision by hard coating treatment or AR treatment. On the other hand, the surface of the narrow width shape part is not treated, and thereby, the light guide prevention structure may be easily formed. Note that, in this case, for example, the narrow width shape part may be covered by the light shielding member.

In yet another aspect of the invention, a surface on which the light guide prevention structure is formed of the surfaces of the narrow width shape part is subjected to roughening treatment. In this case, the leakage lights entering the surface of the narrow width shape part may be adequately diffused by the roughening treatment.

In yet another aspect of the invention, the light guide prevention structure is a rubber part in close contact with a surface of the narrow width shape part. In this case, the rubbery member is in close contact with the surface of the narrow width shape part, and thereby, functions as the light guide prevention structure to prevent light guide of the leakage lights.

In yet another aspect of the invention, the light guide prevention structure is provided in a lens tube part that houses lenses forming a projection system that allows the picture lights from the picture device to enter the light guide device. In this case, for example, a part of the lens tube part is brought into close contact with or bonded to the surface of the narrow width shape part, and thereby, may form the light guide prevention structure.

In yet another aspect of the invention, in the light guide prevention structure, another part is bonded to a space portion formed by the narrow width shape part. In this case, for example, effective utilization of the space portion such that electronic components of various sensors are provided in the space portion formed by the narrow width shape part may be realized by the light guide prevention structure.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, one embodiment of a virtual image display apparatus according to the invention will be explained in detail with reference to FIG. 1 etc.

Figure 1:
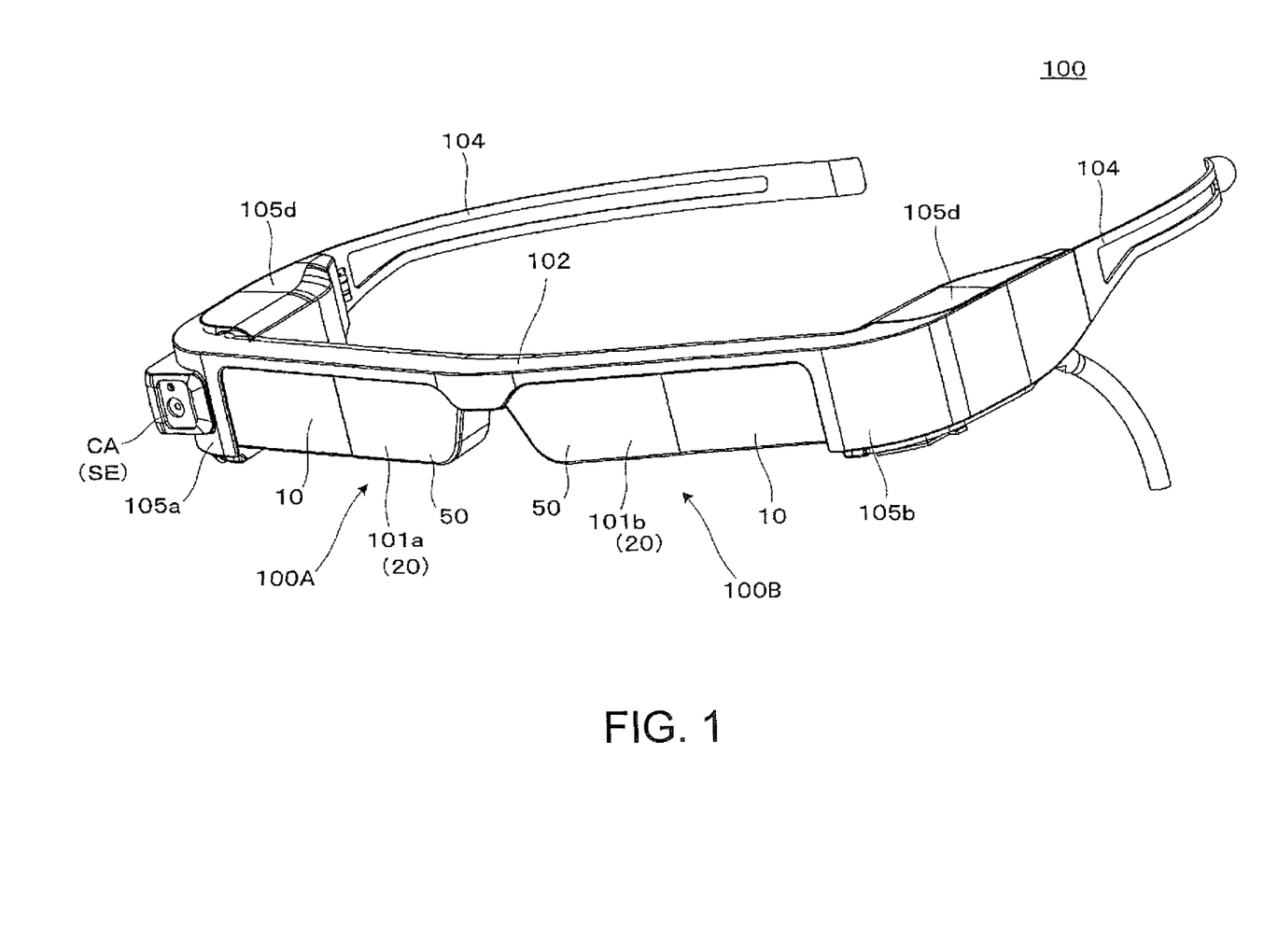
FIG. 1 is a perspective view for brief explanation of an appearance of a virtual image display apparatus as an embodiment of the invention.

As shown in FIG. 1, a virtual image display apparatus 100 of the embodiment is a head mount display having an appearance like spectacles, and allows an observer or a user wearing the virtual image display apparatus 100 to visually recognize image lights (picture lights) by virtual images and visually recognize or observe images of the outside world in see-through vision. The virtual image display apparatus 100 includes a first display apparatus 100A, a second display apparatus 100B, and a frame part 102.

The first display apparatus 100A and the second display apparatus 100B are parts that respectively form virtual images for right eye and left eye, and respectively include first and second optical members 101a, 101b that cover the fronts of the eyes of the observer to allow see-through vision and first and second image formation main body parts 105a, 105b. The first and second image formation main body parts 105a, 105b, which will be described later with reference to FIG. 6 etc., each include a projection lens 30 to be housed in a lens tube part 39 and an image display device 80 containing a picture display device (picture device, image display device) (see FIGS. 6 and 7A and 7B). The first and second optical members 101a, 101b are light guide devices that guide picture lights formed in the first and second image formation main body parts 105a, 105b and superimpose lights from the outside world and the picture lights for visual recognition. Hereinafter, the first optical member 101a or the second optical member 101b is also referred to as "light guide device 20". Note that the first display apparatus 100A and the second display apparatus 100B may singly function as virtual image display apparatuses.

The frame part 102 is formed by e.g. a metal frame and has a role of not only supporting the first and second image formation main body parts 105a, 105b but also protecting the interiors of the first and second image formation main body parts 105a, 105b in cooperation with an external member 105d having a cover shape that covers the parts. Further, the frame part may also have a role of housing a distributing cable or the like.

Note that temples 104 as temple parts extending from both ends on the left and right of the frame part 102 to rearward are provided so that the frame part may support in contact with the ears, temples, or the like of the observer. Further, the first and second image formation main body parts 105a, 105b may be added to the parts from the frame part 102 to the temples 104. Furthermore, a nose receiving portion that supports the frame part 102 in contact with the nose of the observer may be provided with the frame part 102.

In addition, as illustrated, a camera CA as an electronic component or the like may be provided in the frame part 102 or a part of the exterior member 105d (the side of the head when worn).

Figure 2:
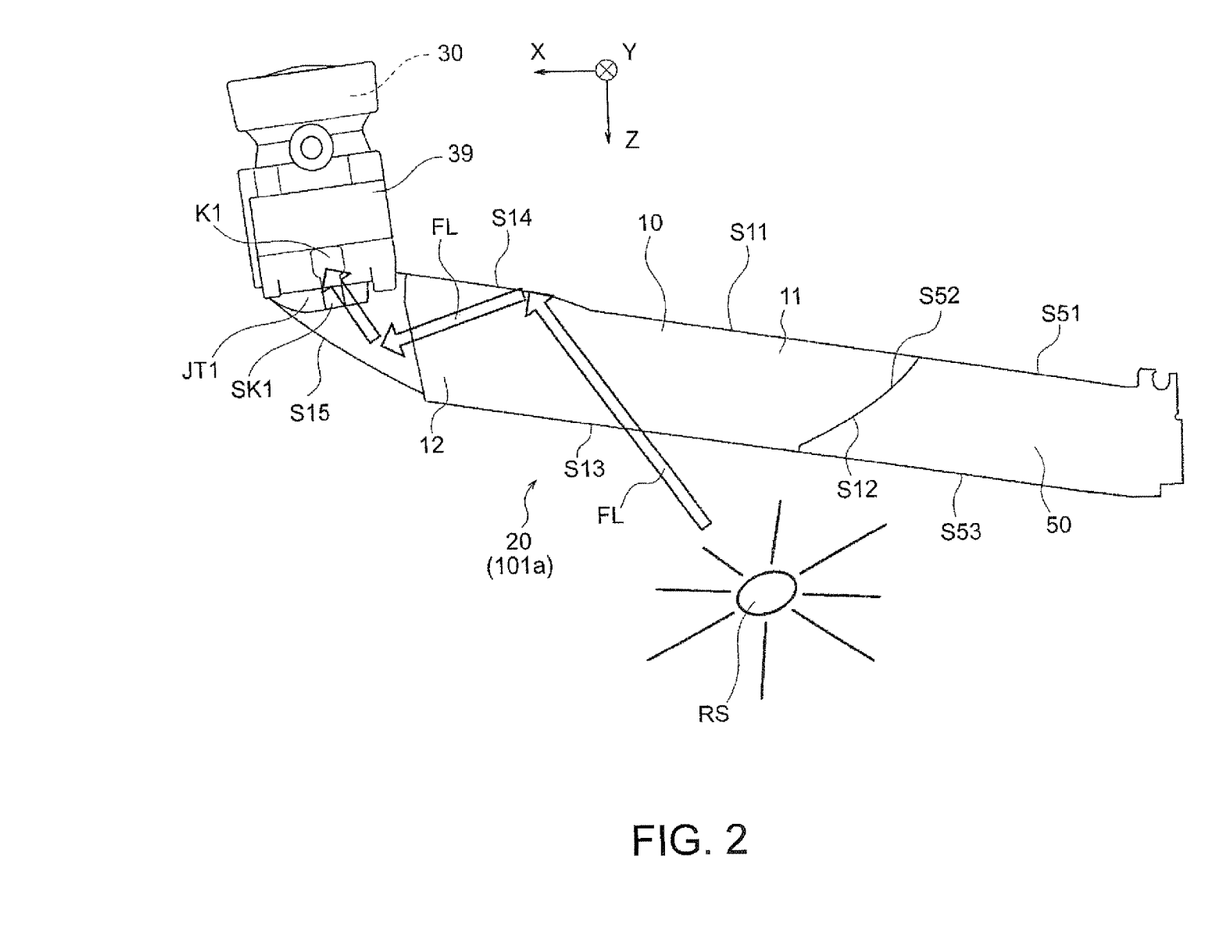
FIG. 2 shows an example of an optical path of leakage light.

As below, a configuration example of the light guide device 20 will be explained with reference to FIGS. 1, 2, etc. Note that FIG. 2 illustrates the light guide device 20 corresponding to the first optical member 101a, however, the same applies to the light guide device 20 corresponding to the second optical member 101b because of symmetry. The light guide device 20 includes a light guide member 10 for light guide and see-through vision and a light transmissive member 50 for see-through vision. Of the members, for example, as shown in FIG. 2, the light guide member 10 includes a first light guide portion 11 provided on the center side closer to the noise, i.e., the light-exiting side and a second light guide portion 12 on the periphery side farther from the nose, i.e., the light-incident side, and the first light guide portion 11 has a first surface S11, a second surface S12, and a third surface S13 as side surfaces having optical functions and the second light guide portion 12 has a fourth surface S14 and a fifth surface S15 as side surfaces having optical functions. Though the details will be described later with reference to FIG. 6 etc., the light guide device 20 has a see-through configuration in which picture lights are guided by reflection using these five surfaces S11 to S15 and the light guide member 10 and the light transmissive member 50 cooperatively superimpose lights from the outside world and the picture lights for visual recognition. Particularly, the light guide device 20 includes non-axisymmetric curved surfaces (free-form surfaces) in the five surfaces S11 to S15, and thereby, can propagate the picture lights with higher accuracy while being downsized.

Here, as illustrated in FIG. 2, in the light guide device 20 having the above described see-through configuration, it may be possible that sunlight and lights from the outside world from a light source RS such as a fluorescent light enter from an exposed part of the light guide device 20, the lights are subjected to unintended reflection by the surfaces S11 to S15, for example, and become leakage lights (stray lights) FL, and are visually recognized by the observer. In the case where see-through vision is secured, entrance of a certain amount of lights from outside is inevitable. Especially, in the case where the surfaces S11 to S15 include the free-form surface as the non-axisymmetric curved surface (e.g. the fourth surface S14), as illustrated in FIG. 2, the probability that a component of the light from the outside world from the light source RS that satisfies a total reflection condition and travels toward the light source side exists is higher, and the light may finally reach the eye of the observer. On the other hand, in the embodiment, a light guide prevention structure (light transmission prevention structure) is provided in the light guide device 20, and thereby, the influence by the leakage lights FL is reduced with the better guide of picture lights maintained.

Figure 3A:
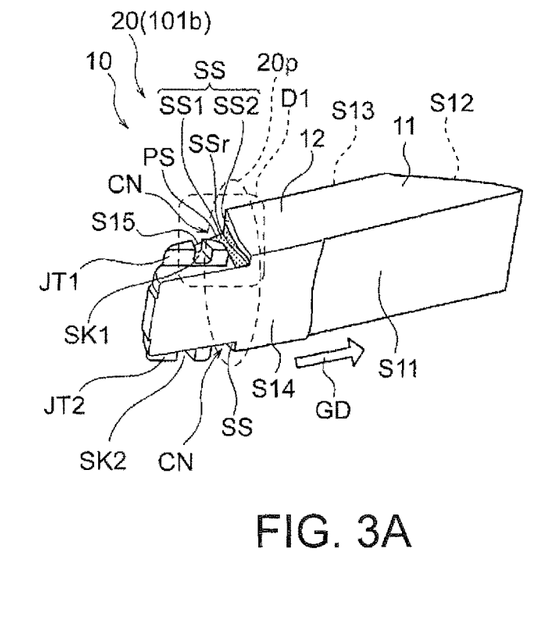
FIGS. 3A and 3B are diagrams for explanation of a structure of a narrow width shape part.
Figure 3B:
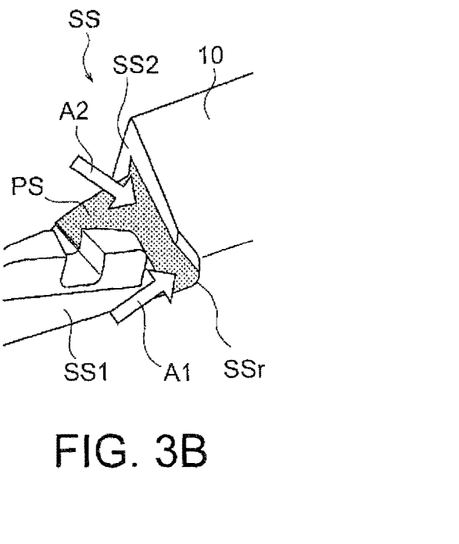

FIGS. 3A and 3B are diagrams for explanation of a light guide prevention structure (light transmission prevention structure) PS provided in the light guide device 20. FIG. 3B is a partially enlarged view of a part shown by a region Dl of FIG. 3A. Further, in FIG. 3A etc., the light guide device 20 for left eye is shown, however, the same applies to the device for right eye. As shown in the drawings, the light guide device 20 has a narrow width shape part 20p forming narrow portions CN having narrower shapes than the surrounded part in a portion on the base side (second light guide portion 12) as an incident portion for picture lights connected to the light source side (picture device side) of picture lights. The shape is inevitable because of downsizing of the product, an association with assembly of another optical system and the light guide device 20, or the like. On the other hand, as described above, generation of the leakage lights FL (see FIG. 2) is also inevitable, and it has been confirmed that the component of the leakage light FL is reflected or refracted, for example, in specific locations forming curved surfaces exemplarily indicated by an arrow A1, an arrow A2, etc. of the narrow width shape part 20p and visually recognized. Accordingly, as shown in the drawings, the light guide prevention structure PS is provided to cover the specific locations of the narrow width shape part 20p, and thereby, the component may be prevented from being guided into the light guide device 20.

For more detailed explanation of the above described specific locations of the narrow width shape part 20p, the shape etc. of the narrow width shape part 20p as a peripheral portion of the light guide prevention structure PS of the light guide device 20 will be explained in further detail. First, the surface of the narrow width shape part 20p has a side surface portion SS as another portion on the side of the side surface than the light guide surface that directly contributes to light guide of picture lights. In other words, the side surface portion SS is a surface that does not directly contribute to the light guide of the picture lights of the surfaces of the light guide device 20. The side surface portion SS includes a first side surface portion SS1 forming the surface of the narrowest portions (narrow portions CN) of the narrow width shape part 20p, a second side surface portion SS2 connecting to a portion on the side on which the shape is wider than the narrow portions CN (the side closer to the first light guide portion 11) of the second light guide portion 12, and a curved surface portion SSr forming a portion from the first side surface portion SS1 to the second side surface portion SS2. Note that, in the case shown in the drawings, the first side surface portion SS1 and the second side surface portion SS2 are flat surfaces or nearly flat surfaces, however, the curved surface portion SSr is a rounded curved surface connecting those portions.

Of the side surface portion SS, the first side surface portion SS1 extending in a light guide direction GD while forming the narrow portions CN has a pair of protruding joint portions JT1, JT2 on the incident side of picture lights (on the side farther from the first light guide portion 11). The joint portions JT1, JT2 are structures for attaching the light guide device 20 to the lens tube part 39 (for example, see FIG. 2), and plate-like members inclined about the Y-axis at a prescribed angle with respect to the surface S11 as one of reference surfaces. Further, as shown in the drawings, the joint portions JT1, JT2 are provided with respect to the vertical direction (height direction) in a pair, and, as a result, the narrow portions CN having the shapes narrower than the surrounding part may be regarded as being formed in the second light guide portion 12. Furthermore, the joint portions JT1, JT2 have screwing portions SK1, SK2 in penetrating elongated hole shapes with U-shape structures, respectively. Regarding the screwing portions SK1, SK2, for example, the screwing portion SK1 corresponds to a hole K1 provided in the lens tube part 39 (for example, see FIG. 2). Thereby, the light guide device 20 is screwed and fixed to the lens tube part 39 at a prescribed inclination angle.

Of the side surface portion SS, the second side surface portion SS2 forming the surface of the portion having the shape wider than the narrow portion CN forms aside surface extending in a perpendicular direction to the light guide direction GD, for example.

Particularly, in the example shown in FIGS. 3A and 3B, the light guide prevention structure PS is formed in a portion from the first side surface portion SS1 to the curved surface portion SSr exemplarily indicated by an arrow A1, an arrow A2, etc. of the above described side surface portion SS. The light guide prevention structure PS is formed in all over the portion from the first side surface portion SS1 extending in the light guide direction GD to the curved surface portion SSr forming the curved surface connecting thereto, and thereby, the above described light guide of the leakage lights FL into the light guide device 20 may be efficiently prevented.

Here, it is considered that the light guide prevention structure PS is formed using a material that absorbs the leakage lights FL. As an example, it is considered that the light guide prevention structure PS is formed using a rubber part fixed with a black adhesive agent. In this case, not only the above described light guide prevention function for leakage lights FL but also an entrance prevention function for water and dust may be provided to the rubber part. Or, as the light guide prevention structure PS, a black rubber part may be directly in close contact with the side surface portion SS not via an adhesive agent. The rubber part is in close contact around the corner portion formed from the first side surface portion SS1 to the curved surface portion SSr of the side surface portion SS of the light guide device 20, and thereby, the light guide prevention structure PS may be provided in all over the location. Or, the light guide prevention structure PS may be formed by application of an adhesive agent colored in e.g. black to the narrow width shape part 20p. The conceivable adhesive agent applied in this case includes not only a UV curing adhesive agent but also a thermosetting adhesive agent, a colored hot-melt adhesive agent, etc. Or, a moldable tape (e.g. black tape) adhesive may be used. In any case, the light guide prevention structure PS is formed in close contact with the prism-shaped main body portion forming the light guide device 20 in the range corresponding to the specific location of the narrow width shape part 20p to absorb the leakage lights FL, and thereby, reflection etc. may be prevented and light guide into the light guide device 20 may be avoided.

Figure 3C:
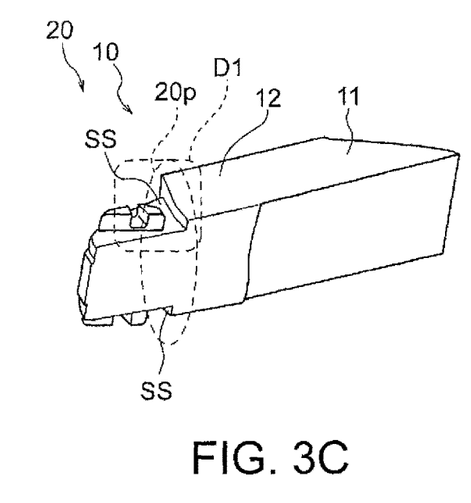
FIGS. 3C and 3D show a comparative example.
Figure 3D:
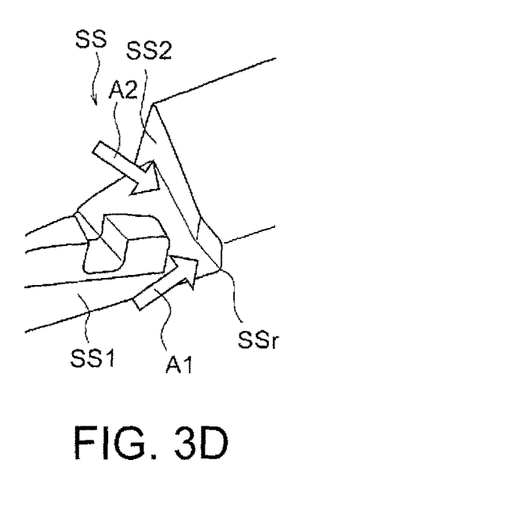
Figure 4:
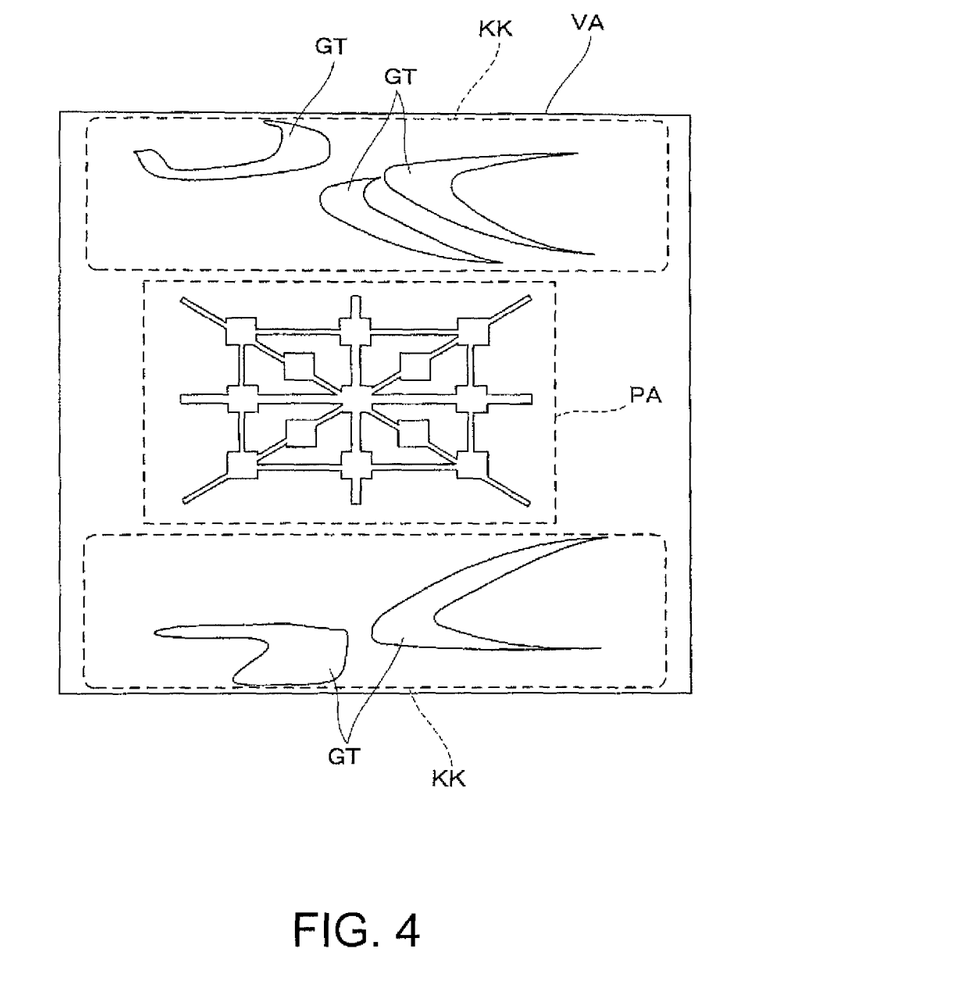
FIG. 4 shows generation of ghost due to leakage lights.

FIGS. 3C and 3D are diagrams for explanation of a comparative example and correspond to FIGS. 3A and 3B, respectively. The comparative example is different from the embodiment in that the light guide prevention structure PS is not provided. In the case of the comparative example, the above described leakage lights FL are guided. When the leakage lights FL are guided into the light guide device 20 and reaches the eye of the observer, for example, as conceptually shown in FIG. 4, in a visual recognition area VA in front of the eye, areas KK in which glaring lights GT appear around a picture PA or the like is generated (light leakage is generated) and hinder picture viewing. Of the light guide device 20, in the second light guide portion 12 on the light-incident side, it is considered that the lights GT (see FIG. 4) or the like to be visually recognized are particularly likely to be generated due to the leakage light FL because of the fourth surface S14 as the light-incident surface and the attachment structures to the lens tube part 39 such as the joint portions JT1, JT2. In the embodiment, the situation can be avoided according to the above described configuration.

Figure 5A:
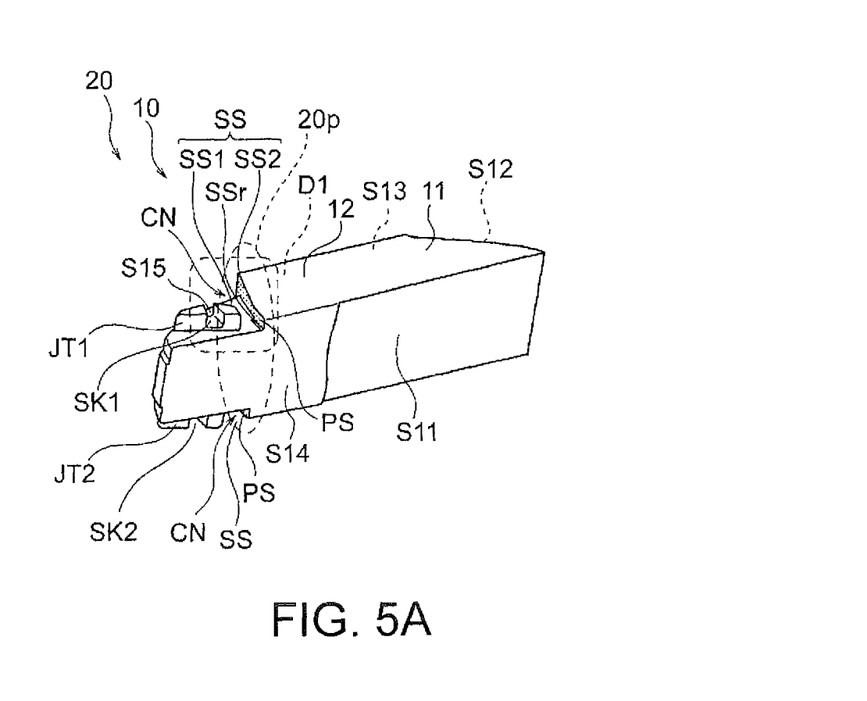
FIGS. 5A and 5B are diagrams for explanation of a modified example of the structure of the narrow width shape part.
Figure 5B:
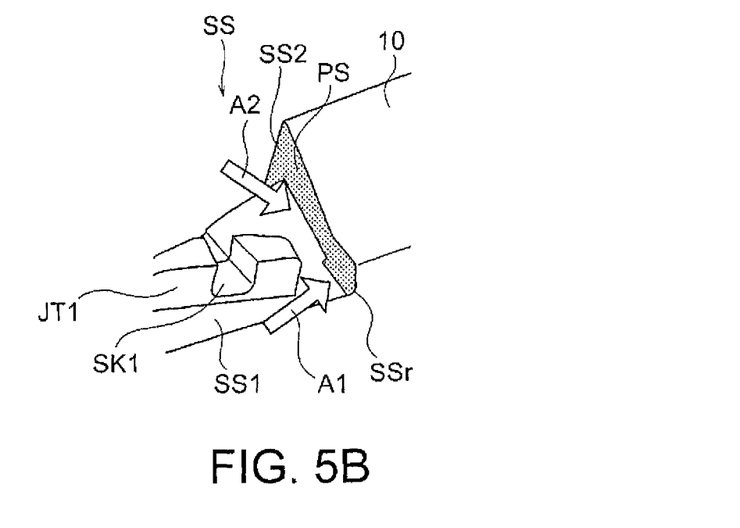

An example shown in FIGS. 5A and 5B is a modified example of the case shown in FIGS. 3A and 3B. The light guide prevention structure PS shown in FIG. 5A etc. is formed in a portion from the curved surface portion SSr to the second side surface portion SS2 exemplarily indicated by an arrow A1, an arrow A2, etc. of the above described side surface portion SS. Even when the light guide prevention structure PS is provided in the portion, prevention of light guide of the leakage lights FL into the light guide device 20 may be expected. Note that the light guide prevention structure PS may be formed in both the range shown in FIGS. 3A and 3B and the range shown in FIGS. 5A and 5B.

Figure 6:
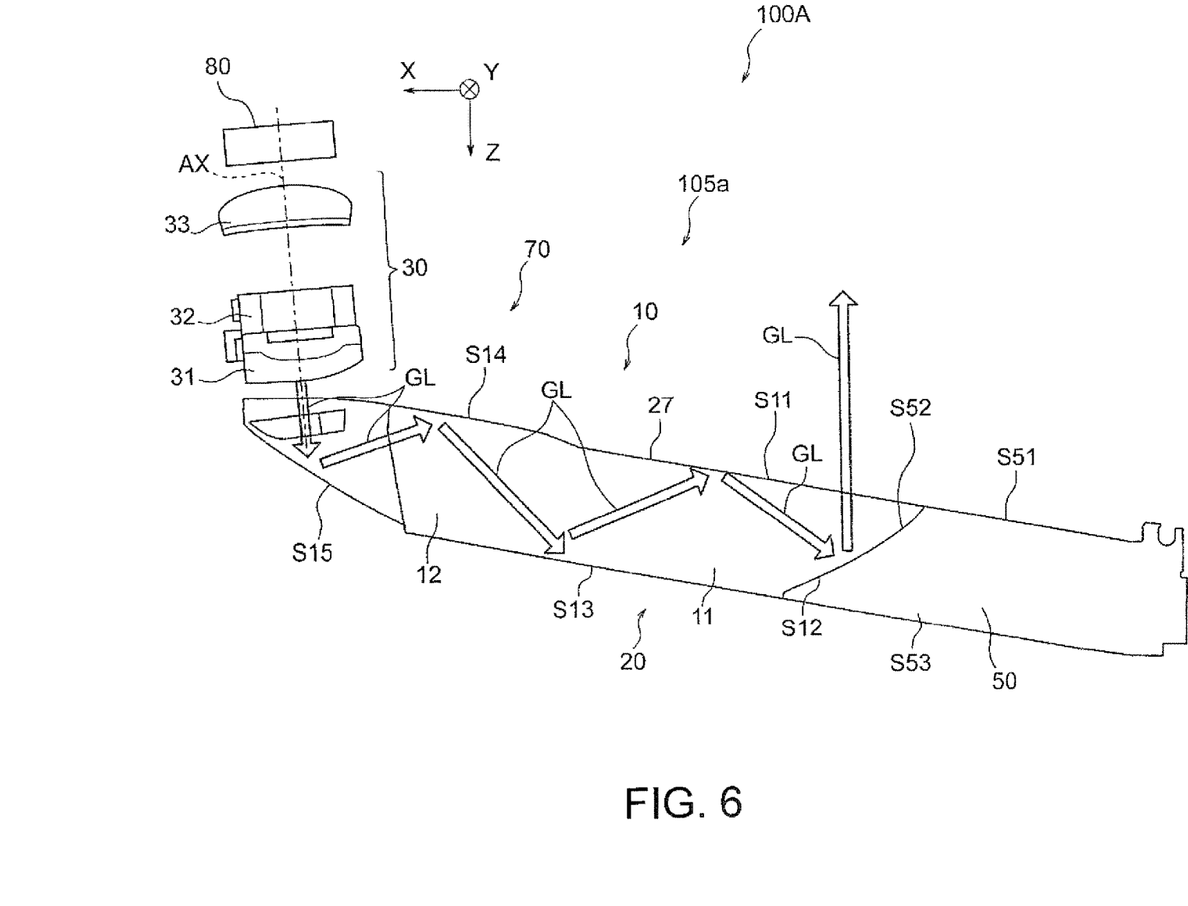
FIG. 6 is a diagram for explanation of a configuration of an optical system of the virtual image display apparatus.
Figure 7A:
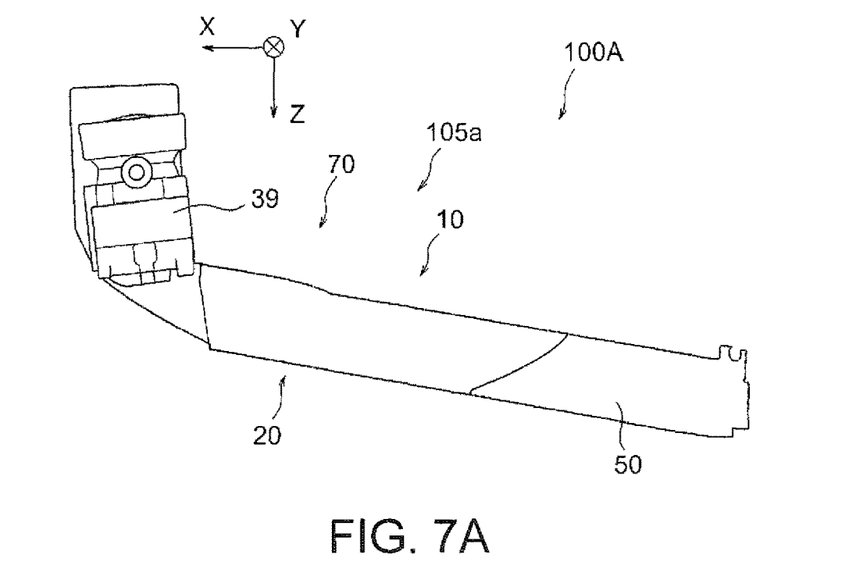
FIG. 7A is another diagram for explanation of a configuration of the virtual image display apparatus.
Figure 7B:
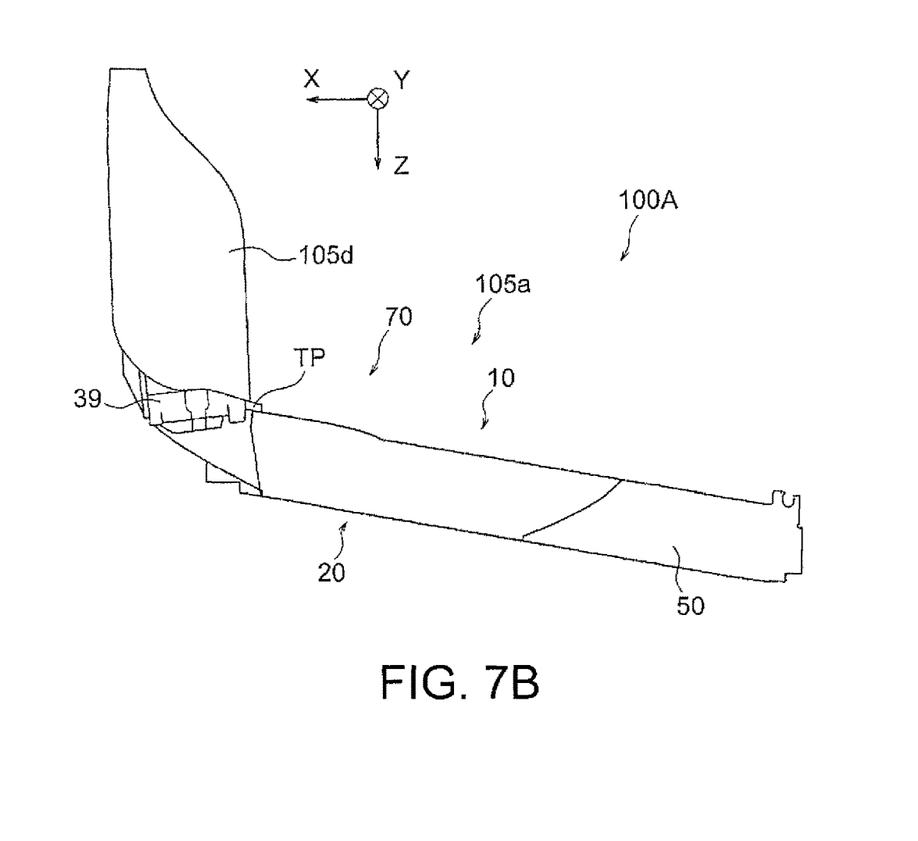
FIG. 7B is yet another diagram for explanation of the configuration of the virtual image display apparatus.

As below, referring to FIG. 6 etc., an example of the structure for guiding picture lights by the virtual image display apparatus 100 etc. will be explained. Note that, as described above, the apparatuses for guiding picture lights are the first display apparatus 100A and the second display apparatus 100B (see FIG. 1), however, the first display apparatus 100A and the second display apparatus 100B have symmetric and equal structures and only the first display apparatus 100A will be explained and the explanation of the second display apparatus 100B will be omitted. Of the respective drawings, FIG. 6 is a diagram for explanation of a configuration of an optical system of the virtual image display apparatus 100 (first display apparatus 100A). FIG. 7A is another diagram for explanation of the configuration of the first display apparatus 100A and shows a state in which the projection lens 30 is housed in the lens tube part 39 and the light guide device 20 is attached to the lens tube part 39. FIG. 7B is yet another diagram for explanation of the configuration of the first display apparatus 100A and shows a state in which the lens tube part 39 in FIG. 7A is attached to the external member 105d.

As shown in FIG. 6 etc., the first display apparatus 100A may be regarded as an apparatus including a projection see-through device 70 as an optical system for projection and the image display device 80 that forms picture lights. The projection see-through device 70 has a role of projecting an image formed by the image display device 80 as a virtual image on the eye of the observer. The projection see-through device 70 includes the light guide device 20 (first optical member 101a) and the projection lens 30 for imaging. As described above, the light guide device 20 includes the light guide member for light guide and see-through vision and the light transmissive member 50 for see-through vision. The first image formation main body part 105a shown in FIG. 1 includes the image display device 80 and the projection lens 30. Further, the projection lens 30 including a lens group is housed by the lens tube part 39 shown in FIG. 7A. Further, as shown in FIG. 7B, the lens tube part 39 with a part of the light guide device 20 is covered by the external member 105d or the frame part 102 (see FIG. 1). The narrow width shape part 20p including the light guide prevention structure PS is covered by the external member 105d as a light shielding member and the frame part 102 (see FIG. 1) and shielded from the lights from the outside world. In this regard, the narrow width shape part 20p forming the narrow portions CN for accurate incorporation in another optical component is connected to an attachment portion TP on the end side of the frame part 102 and the external member 105d (light shielding member). In other words, the narrow width shape part 20p is located on the side closer to the exposed portion. Accordingly, direct entrance of lights from the outside world is avoided by the light shielding effect in the external member 105d etc., however, when the above described leakage lights are generated, the narrow width shape part 20p is readily affected thereby. On the other hand, in the embodiment, as described above, the leakage lights can be addressed by the light guide prevention structure PS. The narrow width shape part 20p is separated from the image display device 80 on the light source side, and thus, it is considered that the influence on the part by generation of unintended lights due to unwanted component lights generated on the light source light side is easily avoided by providing another light shielding member on the side closer to the light source, for example. Note that the narrow width shape part 20p may be adapted to absorb the unwanted component lights as well.

Returning to FIG. 6, the image display device 80 may be a picture display device (picture device, image display device) including a self-emitting device such as an organic EL, for example. Further, the device may be a picture display device (picture device, image display device) as e.g. a transmissive spatial light modulation device or may have an illumination device (not shown) as a backlight that outputs illumination light to the picture display device (image display device) and a drive control unit (not shown) that controls operations.

The projection lens 30 is a projection system including three optical elements (lenses) 31 to 33 along an incident-side optical axis AX as component elements, and these optical elements 31 to 33 are housed and supported by the lens tube part 39 shown in FIG. 7A. The optical elements 31 to 33 each include an aspheric lens containing both a non-axisymmetric aspheric surface and an axisymmetric aspheric surface, and form an intermediate image corresponding to a display image inside of the light guide member 10 in cooperation with a part of the light guide member 10. The projection lens 30 projects the picture lights formed by the image display device 80 on the light guide device 20 and allows the lights to enter the device.

As described above, the light guide device 20 includes the light guide member 10 for light guide and see-through vision and the light transmissive member 50 for see-through vision. The light guide member 10 is a part of the prism-shaped light guide device 20 and an integrated member, however, may be regarded as a division into the first light guide portion 11 on the light-exiting side and the second light guide portion 12 on the light-incident side. The light transmissive member 50 is a member that assists the see-through function of the light guide member 10 (auxiliary optical block) and integrally fixed to the light guide member 10 into one light guide device 20. The light guide device 20 is screwed into the lens tube part 39, for example, and accurately positioned and fixed to the projection lens 30.

As described above, the light guide member 10 has the first to fifth surfaces S11 to S15 as side surfaces having optical functions. Of the surfaces, the first surface 911 and the fourth surface S14 are continuously contiguous and the third surface S13 and the fifth surface 915 are continuously contiguous. Further, the second surface S12 is placed between the first surface S11 and the third surface S13. A half-mirror layer is provided on the second surface S12. The half-mirror layer is a reflection film having light transmissivity (i.e., semi-transmissive reflection film) and formed by deposition of a metal reflection film or a dielectric multilayer film, and has reflectance appropriately set for picture lights.

As below, referring to FIG. 6, optical paths of picture lights (here, picture lights GL) will be schematically explained. The light guide member 10 allows the picture lights GL to enter from the projection lens 30 and guides the lights toward the eye of the observer by reflection etc. using the first to fifth surfaces S11 to 15. Specifically, the picture lights GL from the projection lens 30 first enter the fourth surface S14, are reflected by the fifth surface 915, enter the fourth surface S14 from inside again and are totally reflected, enter the third surface S13 and are totally reflected, and enter the first surface S11 and are totally reflected. The picture lights GL totally reflected by the first surface 911 enter the second surface S12, are partially reflected while being partially transmitted through the half mirror layer provided on the second surface 912, and enter the first surface 911 again and pass through the surface. The picture lights GL that have passed through the first surface S11 enter the eye of the observer or an equal position thereto as nearly parallel pencils of rays. That is, the observer observes an image by the picture lights as a virtual image.

As described above, the light transmissive member 50 is integrally fixed to the light guide member 10 to form one light guide device 20 and the member that assists the see-through function of the light guide member 10 (auxiliary optical block). The light transmissive member 50 has a first transmissive surface S51, a second transmissive surface S52, and a third transmissive surface S53 as side surfaces having optical functions. The second transmissive surface S52 is provided between the first transmissive surface S51 and the third transmissive surface S53. The first transmissive surface S51 is on a surface as an extension of the first surface 911 of the light guide member 10, and the second transmissive surface 952 is a curved surface joined to and integrated with the second surface 912, and the third transmissive surface S53 is on a surface as an extension of the third surface S13 of the light guide member 10.

The light guide device 20 allows the observer to visually recognize the picture lights using the light guide member 10 as described above and to observe an outside world image with less distortion in cooperation between the light guide member 10 and the light transmissive member 50. That is, of the lights from the outside world as component lights forming an outside world image to be visually recognized, the light entering closer to the +X side than the second surface S12 of the light guide member 10 passes through the third surface S13 and the first surface S11 of the first light guide portion 11 and, in this regard, almost no aberration or the like is generated because the third surface S13 and the first surface S11 are nearly in parallel to each other (diopter scale nearly zero). Further, of the lights from the outside world, when the light entering closer to the −X side than the second surface S12 of the light guide member 10, i.e., the light entering the light transmissive member 50 passes through the third transmissive surface S53 and the first transmissive surface S51 provided therein, no aberration or the like is generated because the third transmissive surface S53 and the first transmissive surface S51 are nearly in parallel to each other. Furthermore, of the lights from the outside world HL, when the light entering the light transmissive member 50 corresponding to the second surface S12 of the light guide member 10 passes through the third transmissive surface S53 and the first surface S11, almost no aberration or the like is generated because the third transmissive surface S53 and the first surface S11 are nearly in parallel to each other. In the above described manner, the observer observes an outside world image without distortion through the light transmissive member 50.

Note that the main body parts of the prism-shaped light guide member 10 and the light transmissive member 50 are formed using a material such as e.g. cycloolefin polymer by metal molding. Further, treatment of hard coating (hard coating treatment) or treatment of AR coating (AR treatment) is performed on the surfaces of the main body parts, and a coating layer 27 is formed and exhibits higher light transmissivity in the visible range.

As described above, the virtual image display apparatus 100 according to the embodiment has the see-through configuration that guides the picture lights by the light guide device 20 and superimposes the lights from the outside world and the picture lights for visual recognition. The light guide device 20 has the light guide prevention structure PS in the narrow width shape part 20p having the narrower shape than the surrounded part, and suppresses light guide of the unintended lights due to lights from the outside world toward the observer side and the better light guide condition of the picture lights may be maintained.

Figure 8A:
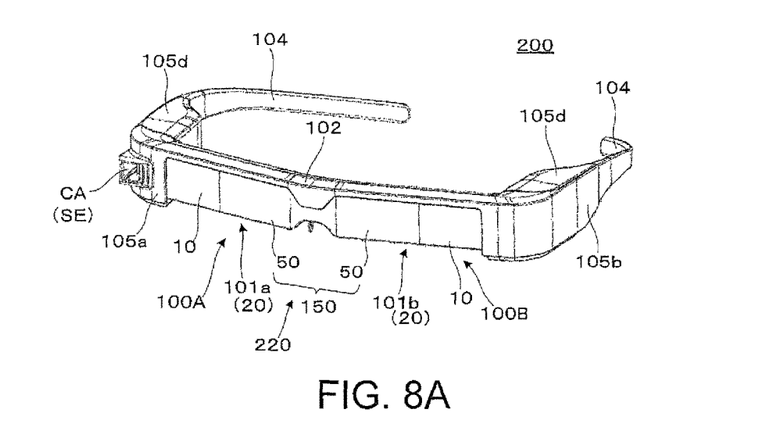
FIG. 8A is a perspective view for brief explanation of an appearance of a virtual image display apparatus of a modified example.
Figure 8B:
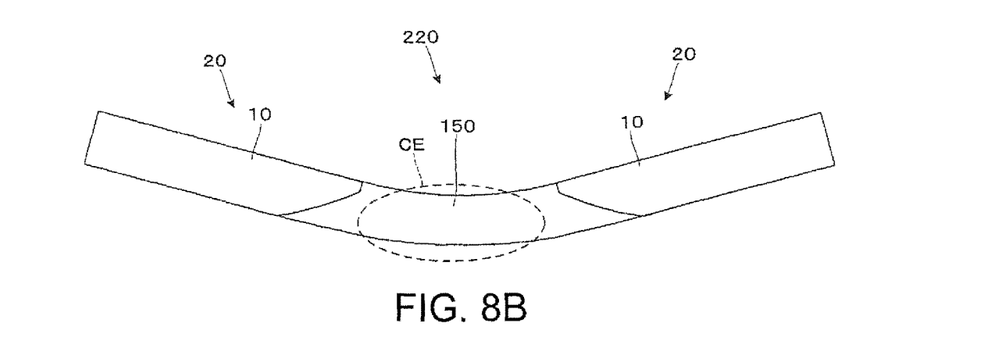
FIG. 8B is a conceptual plan view for explanation of a modified example of a light guide device.
Figure 8C:
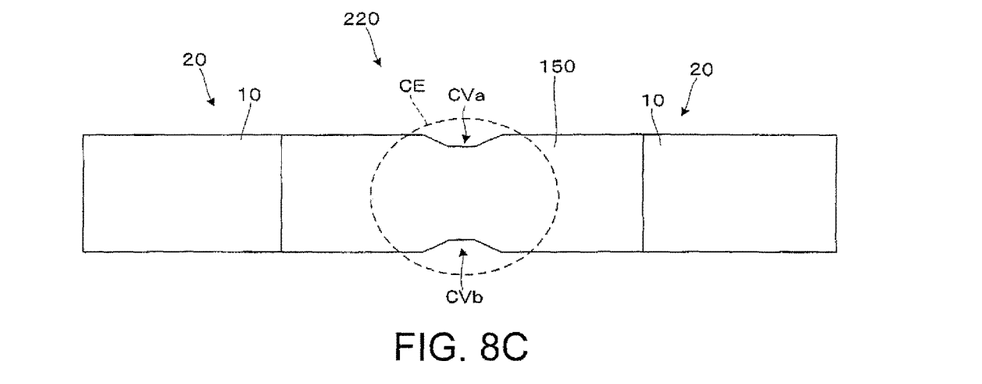
FIG. 8C is a front view thereof.

As below, a virtual image display apparatus of a modified example of the embodiment will be explained with reference to FIG. 8A etc. In the above described embodiment, the left and right light guide devices 20 are individually fabricated, however, not limited to the configuration, for example, the light transmissive member may be used in common. FIG. 8A is a perspective view of a virtual image display apparatus 200 of a modified example, and FIGS. 8B and 8C are a plan view and a front view for conceptual explanation of an integrated light guide device 220 in the virtual image display apparatus 200. The integrated light guide device 220 forms a pair of left and right light guide devices 20, 20 by a configuration including a pair of left and right light guide members 10, 10 and an integrated light transmissive member 150 connecting the pair of left and right light guide members 10, 10 at the center and functioning as a light transmissive member for both. That is, in the example, the integrated light guide device 220 integrated as an integrated optical member by connection of the pair of left and right light guide members 10, 10 with the single integrated light transmissive member 150 corresponding to a pair of left and right light transmissive members 50, 50 in between functions as a device corresponding to the pair of left and right light guide devices 20, 20. In this case, alignment for binocular vision may be simply and accurately performed by the integrated light transmissive member 150. For example, as shown in FIG. 8B, left and right angles can be specified by appropriately bending of a center portion CE of the integrated light transmissive member 150. Further, for example, as shown in FIG. 8C, concave portions CVa, CVb are provided in the upper and lower ends of the center portion CE, and thereby, the concave portions CVa, CVb can be used for positioning (positional fixing) for bonding and fixing of the light guide members 10, 10 to the integrated light transmissive member 150 in the manufacturing process or used as a location for providing the nose receiving portion.

Figure 9A:
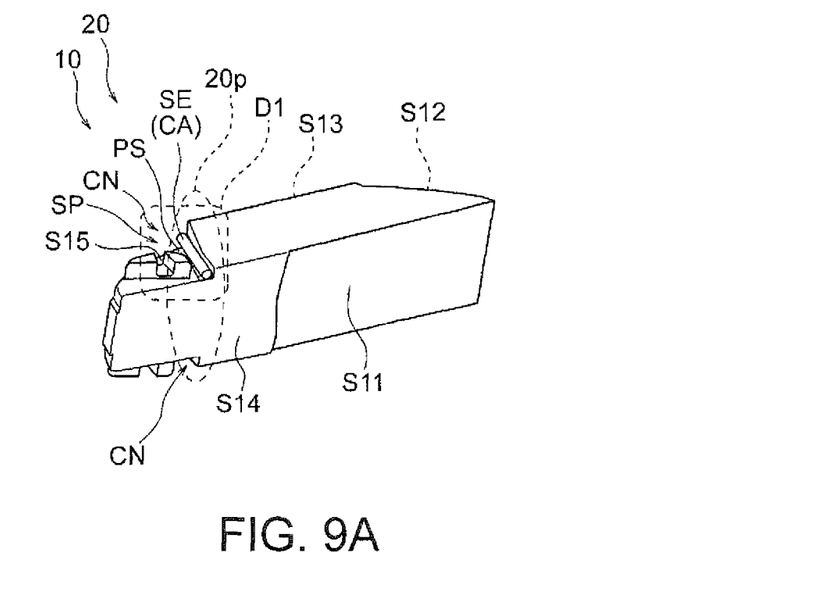
FIG. 9A is a diagram for explanation of a modified example of a structure of a narrow width shape part.
Figure 9B:
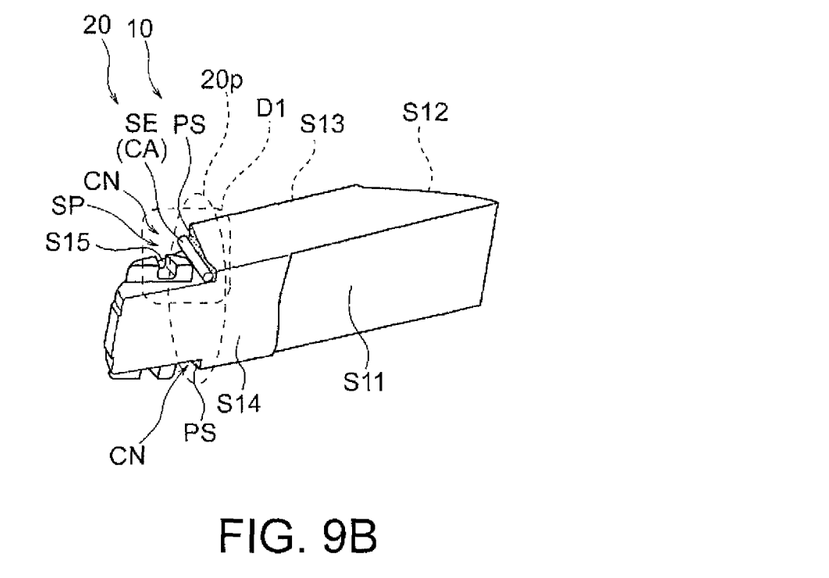
FIG. 9B is a diagram for explanation of another modified example of the structure of the narrow width shape part.

As below, a modified example of the light guide prevention structure in the embodiment will be explained with reference to FIG. 9A etc. FIG. 9A shows a modified example of the light guide prevention structure PS shown in FIG. 3A in which various sensors SE as other components different from the optical system for light guide are bonded to a space portion SP formed by the narrow portions CN in the narrow width shape part 20p. That is, the adhesive property of the light guide prevention structure PS is used, and thereby, electronic components of the various sensors SE etc. (e.g. the camera CA shown in FIG. 1 etc. and the components forming the camera etc.) and various kinds of equipment to be mounted on the virtual image display apparatus 100 may be provided in the space portion SP and the space portion SP resulting from the narrow portions CN may be effectively utilized. From another point of view, when the electronic components of the various sensors SE etc. are provided, a structure that fulfills the above described function of the light guide prevention structure PS may be formed. Note that FIG. 9B shows a modified example of the light guide prevention structure PS shown in FIG. 5A regarding the same configuration as that described above.

Other Examples

As above, the invention is explained according to the embodiment. However, the invention is not limited to the above described embodiment, but may be implemented in various forms without departing from the scope thereof and the following modifications can be made, for example.

In the above described embodiment, for example, in the second light guide portion 12 forming the light-incident side of the light guide device 20, the joint portions JT1, JT2 protruding on the side surfaces of the fourth surface S14 as the incident surface of picture lights are provided, and thereby, the narrow width shape part 20p forms the narrow portions CN and the light guide prevention structure PS is provided in the narrow portions CN and the surrounding part. In other words, the light guide prevention structure PS is provided in the narrow width shape part formed when auricular structures (joint portions JT1, JT2 etc.) are provided in the light-incident portion (second light guide portion 12). However, the embodiment is not limited to that. Various forms may be considered with respect to the narrow width shape part 20p of the light guide device 20. For example, even in the case without the auricular structures in the light-incident portion, when the narrow width shape part having the narrower shape than the surrounding part is provided, for example, the light guide prevention structure PS is provided in the side surface portion of the narrow width shape part, and thereby, prevention of the above described light guide of the leakage light into the light guide device 20 may be expected.

In the above described embodiment, the case where the light guide prevention structure PS is formed using the rubber part and the adhesive agent is explained, however, the light guide prevention structure PS may be formed in various forms, not limited to that. For example, if a location in which the light guide prevention structure PS is formed in the narrow width shape part 20p may be specified in advance according to the design of the optical system, an embossed surface is formed in the location at molding and may function as the light guide prevention structure PS.

In the above described example, the hard coating or AR coating treatment is performed on the surface in the formation of the light guide device 20, however, the first surface S11 etc. as the light guide surfaces that guide the picture lights and the first transmissive surface S51 etc. that allow lights from the outside world to pass of the light guide device 20 are exposed portions and hard coating treatment or AR treatment may be desired thereon, however, the surface of the narrow width shape part 20p is covered by e.g. a light shielding member, and thereby, may not be functionally hindered without coating treatment. Without the coating treatment, for example, the function of the embossed surface as the above described light guide prevention structure PS may be easily maintained. Specifically, for example, assuming that the coating treatment is performed, it is considered that the necessary surface roughness of the embossed surface is equal to or more than 40 μm, while, without the coating treatment, the sufficient surface roughness of the embossed surface may be equal to or more than 1 μm.

Further, surface roughening as secondary processing (sandblasting or the like) may be performed on the surface of the narrow width shape part so that the surface may function as the light guide prevention structure PS.

Furthermore, regarding the configuration of the light guide prevention structure PS, the adhesive agent for bonding between the lens tube part 39 and the light guide device 20 or another member may be used.

Figure 10A:
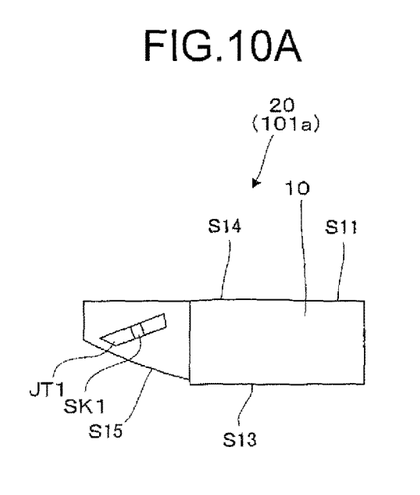
FIGS. 10A to 10D conceptually show a modified example of the virtual image display apparatus.
Figure 10B:
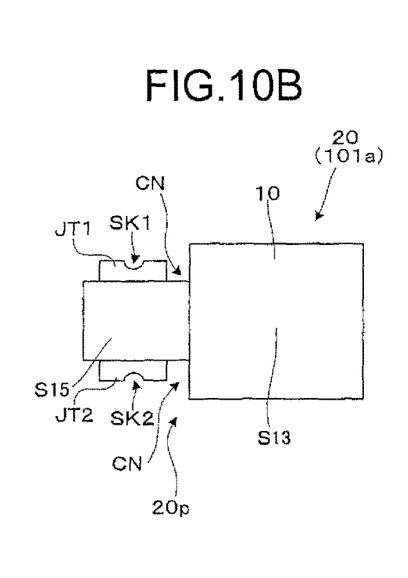
Figure 10C:
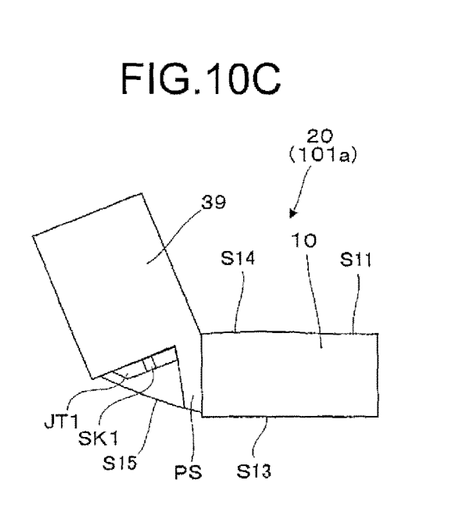
Figure 10D:
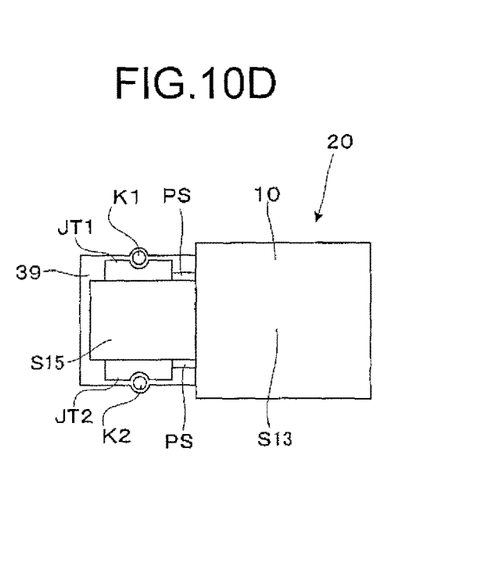

As conceptually exemplified in FIGS. 10A to 10D, a part of the lens tube part 39 may be used as the light guide prevention structure PS. That is, the light guide prevention structure PS may be provided in the lens tube part 39. As below, a specific explanation will be made with reference to FIGS. 10A to 10D. First, FIGS. 10A and 10B are a plan view and a front view conceptually showing an example of the light guide device 20 and FIGS. 10C and 10D are a plan view and a front view conceptually showing a state in which the lens tube part 39 is attached to the light guide device 20 in FIGS. 10A and 10B. In correspondence with the surface shapes of the narrow portions CN of the narrow width shape part 20p of the light guide device 20 conceptually shown in FIGS. 10A and 10B, an extension portion to be the light guide prevention structure PS is formed on an end of the lens tube part 39 conceptually shown in FIGS. 10O and 10D. That is, when the lens tube part 39 and the light guide device 20 are assembled by screwing and fixing of the screwing portions SK1, SK2 of the light guide device 20 and the holes K1, K2 of the lens tube part 39 provided in correspondence thereto, respectively, the extension portion of the lens tube part 39 is brought into close contact with or bonded to the surface of the narrow width shape part 20*p* of the light guide device 20, and thereby, the light guide prevention structure PS is formed. Note that the above described example is just an example, and various other configurations than the above described one may be applied to the form using a part of the lens tube part 39 as the light guide prevention structure PS. Further, for example, the extension portion to be the light guide prevention structure PS may be integrally molded in fabrication of the lens tube part 39 made of resin or the location to be the extension portion may be formed by attachment of another rubber member. Or, the extension portion is not provided for formation of the light guide prevention structure PS in the lens tube part 39 as described above, but a portion originally forming a part of the structure of the lens tube part 39 may be placed in a specific location of the narrow portions CN after assembly, and the light guide prevention structure PS may be formed as a result.

In addition, in the attachment portion TP on the end of the member that may function as the light shielding member (light shielding case) of the narrow width shape part 20*p* of the light guide device 20 including the frame part 102 and the external member 105*d* and the light shielding member (light shielding case) provided separately from those, a colored adhesive agent or lubricating oil (grease) may be used and the light shielding member (light shielding case) may be placed via the colored adhesive agent or lubricating oil so that the member may function as the light guide prevention structure PS. Note that, in this case, the adhesive agent and the lubricating oil may have water-proof and dust-proof functions.

In the above description, as the image display device 80, various devices may be used. For example, a configuration using a reflective liquid crystal display device can be employed, and a digital micromirror device or the like may be used in place of the picture display device (image display device) including the liquid crystal display device.

Various forms may be considered for the light guide device 20. A form with a hologram provided on the light-incident surface or the like may be assumed, and, in this case, the light guide prevention structure (light transmission prevention structure) PS is provided on the light-incident side on which the hologram is provided.

In the above described embodiment, the light guide device 20 has a configuration that covers the entire front of the eye of the wearer, however, a compact configuration that partially covers the front of the eye with the other part uncovered may be employed.

In the above description, the virtual image display apparatus 100 having the pair of display apparatuses 100A, 100B is explained, however, only a single display apparatus may be employed. That is, one pair of the projection see-through device 70 and the image display device 80 are not provided for each of the right eye and the left eye, but the projection see-through device 70 and the image display device 80 may be provided only for one of the right eye and the left eye and the image may be seen with one eye.

In the above description, the half mirror layer on the second surface S12 is e.g. the metal reflection film or the dielectric multilayer film, however, the layer may be replaced by a planar or curved hologram element.

In the above description, the light guide member 10 etc. extend in the lateral direction in which the eyes are aligned, however, the light guide member 10 may be provided to extend in the longitudinal direction. In this case, the light guide member 10 has a parallel-arrangement structure, not the series-arrangement structure.

The entire disclosure of Japanese Patent Application No. 2015-251074, filed Dec. 24, 2015 is expressly incorporated by reference herein.

What is claimed is:

1. A virtual image display apparatus comprising:
a display that generates picture lights; and
a light guide device that guides the picture lights from the display by reflection using a plurality of surfaces and superimposes lights from the outside world and the picture lights for visual recognition,
wherein the light guide device comprises:
a light guide prevention structure that prevents light guide of leakage lights due to reflection of the lights from the outside world by a curved surface of the light guide device in a narrow width shape part having a narrower shape than a surrounding part; and
a light shielding member that covers and directly contacts a surface of the narrow width shape part of the light guide device,
wherein the light guide prevention structure is provided in a lens tube part that houses lenses forming a projection system that allows the picture lights from the display to enter the light guide device, and the lens tube part houses a portion of the light guide device.

2. The virtual image display apparatus according to claim 1, wherein the light guide prevention structure is formed on a side of another side surface than a light guide surface that directly contributes to light guide of the picture lights of surfaces of the narrow width shape part.

3. The virtual image display apparatus according to claim 1, wherein the light guide device comprises non-axisymmetric curved surfaces as the plurality of surfaces that guide the picture lights.

4. The virtual image display apparatus according to claim 1, wherein the narrow width shape part of the light guide device is provided on an incident side of the picture lights of the light guide device and connected to an attachment part of the light shielding member.

5. The virtual image display apparatus according to claim 1, wherein the light guide prevention structure is formed by application of a colored adhesive agent to the narrow width shape part.

6. The virtual image display apparatus according to claim 5, wherein the adhesive agent forming the light guide prevention structure is black and one of a UV curing adhesive agent, a thermosetting adhesive agent, a moldable tape adhesive, and a hot-melt adhesive agent.

7. The virtual image display apparatus according to claim 1, wherein a surface on which the light guide prevention structure is formed of the surfaces of the narrow width shape part of the light guide device is an embossed surface.

8. The virtual image display apparatus according to claim 1, wherein surfaces of the light guide surfaces of the light guide device are subjected to hard coating treatment or AR treatment, and a surface on which the light guide prevention structure is formed of the surfaces of the narrow width shape part is not subjected to hard coating treatment or AR treatment.

9. The virtual image display apparatus according to claim 1, wherein a surface on which the light guide prevention structure is formed of the surfaces of the narrow width shape part is subjected to roughening treatment.

10. The virtual image display apparatus according to claim 1, wherein the light guide prevention structure is a rubber part in close contact with a surface of the narrow width shape part.

11. The virtual image display apparatus according to claim 1, wherein, in the light guide prevention structure, another part is bonded to a space portion formed by the narrow width shape part.

12. The virtual image display apparatus according to claim 1, wherein the light guide prevention structure prevents light guide of leakage lights due to reflection of the lights from the outside world that entered an exposed part of the light guide device by the curved surface of the light guide device in the narrow width shape part having the narrower shape than the surrounding part.

* * * * *